(12) United States Patent
Aramoto et al.

(10) Patent No.: US 8,885,612 B2
(45) Date of Patent: Nov. 11, 2014

(54) CONTROL STATION, MOBILE STATION, MOBILE COMMUNICATION SYSTEM AND MOBILE COMMUNICATION METHOD

(75) Inventors: Masafumi Aramoto, Osaka (JP); Hirokazu Naoe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 486 days.

(21) Appl. No.: 13/127,727

(22) PCT Filed: Nov. 2, 2009

(86) PCT No.: PCT/JP2009/068750
§ 371 (c)(1),
(2), (4) Date: May 5, 2011

(87) PCT Pub. No.: WO2010/053066
PCT Pub. Date: May 14, 2010

(65) Prior Publication Data
US 2011/0206013 A1  Aug. 25, 2011

(30) Foreign Application Priority Data

Nov. 6, 2008 (JP) .................... 2008-285689

(51) Int. Cl.
*H04W 36/26* (2009.01)
*H04W 36/14* (2009.01)
*H04W 28/10* (2009.01)

(52) U.S. Cl.
CPC .............. *H04W 36/26* (2013.01); *H04W 36/14* (2013.01); *H04W 28/10* (2013.01)
USPC ........... 370/332; 370/331; 370/328; 370/329; 455/436

(58) Field of Classification Search
CPC . H04W 36/26; H04W 36/14; H04W 36/0022; H04W 4/22; H04W 80/04; H04W 28/04

USPC ................. 370/331, 332, 333, 252, 328, 329; 455/436

See application file for complete search history.

(56) References Cited

U.S. PATENT DOCUMENTS

2009/0016282 A1* 1/2009 Gasparroni et al. .......... 370/329
2009/0253434 A1 10/2009 Hayashi et al.

(Continued)

FOREIGN PATENT DOCUMENTS

| JP | 2005-57551 A | 3/2005 |
| JP | 2008-113227 A | 5/2008 |

(Continued)

OTHER PUBLICATIONS

3GPP TS 23.401 V8.3.0 (Sep. 2008), 3rd Gernation Partnership Project; Technical Specification Group Services and System Aspects; General Packet Radio Service (GPRS) enhancements for Evolved Universal Terrestrial Radio Access Network (E-UTRAN) access (Release 8), pp. 1-204.

(Continued)

*Primary Examiner* — Jamal Javaid
(74) *Attorney, Agent, or Firm* — Birch, Stewart, Kolasch & Birch, LLP

(57) ABSTRACT

When performing a handover from an access network B to an access network A, a UE 10 transmits an attach request to an MME 30. MME 30 establishes a bearer on a first access network based on the attach request. UE 10 requests MME 30 to establish a specific bearer that guarantees the necessary QoS for a flow. MME 30 receives the request for establishment of a specific bearer, establishes a specific bearer that guarantee the QoS for the flow and sets up a path for performing communication of the flow between UE 10 and a PGW 20. This enables the mobile station to select a specific flow among a plurality of flows and be directly handed over to the bearer communication path when the mobile station performs a handover, thus providing a mobile communication system and the like that can realize a handover while maintaining communication quality.

6 Claims, 12 Drawing Sheets

(56) References Cited

U.S. PATENT DOCUMENTS

2010/0020767 A1    1/2010  Kumai et al.
2010/0091653 A1*   4/2010  Koodli et al. ................ 370/235

FOREIGN PATENT DOCUMENTS

| WO | WO 2008/040503 A2 | 4/2008 |
| WO | WO 2008/072687 A1 | 6/2008 |
| WO | WO 2008/114449 A1 | 9/2008 |

OTHER PUBLICATIONS

3GPP TS 23.402, V8.3.0 (Sep. 2008), 3rd Generation Partnership Project; Technical Specification Group Services and System Aspects; Architecture enhancements for non-3GPP accesses (Release 8), pp. 1-190.

Soliman, H., Elevate Technologies, Jul. 14, 2008, "Mobile IPv6 Support for Dual Stack Hosts and Routers Draft-ietf-mext-nemo-v4traversal-05.txt", Network Working Group, Internet-Draft, pp. 1-48.

* cited by examiner

| Flow | Transfer Path |
|---|---|
| Flow 1 (TFT1, FlowID1) | DSMIP Transfer Path |
| Flow 2 (TFT2, FlowID2) | DSMIP Transfer Path |

(b)

| Flow | Transfer Path |
|---|---|
| Flow 1 (TFT1, FlowID1) | DSMIP Transfer Path |
| Flow 2 (TFT2, FlowID2) | DSMIP Transfer Path |

| Flow | Transfer Path |
| --- | --- |
| Flow 1 (TFT1, FlowID1) | EPS Bearer 2 |
| Flow 2 (TFT2, FlowID2) | DSMIP Transfer Path |

(b)

| Flow | Transfer Path |
| --- | --- |
| Flow 1 (TFT1, FlowID1) | EPS Bearer 2 |
| Flow 2 (TFT2, FlowID2) | DSMIP Transfer Path |

CONTROL STATION, MOBILE STATION, MOBILE COMMUNICATION SYSTEM AND MOBILE COMMUNICATION METHOD

TECHNICAL FIELD

The present invention relates to a control station or the like which is set with a mobile station connectable to a first access network capable of establishing a bearer transfer path that guarantees a predetermined QoS and a second access network different from the first access network; and a path for performing communication of a plurality of flows by way of the second access network. The control station includes: an attach request receiving means that receives an attach request in order for the mobile station to perform a handover from the second access network to the first access network; and a bearer establishing means that establishes a bearer on the first access network when receiving the attach request.

BACKGROUND ART

Conventionally, in mobile communication systems, there have been various known techniques to control the handover of a mobile station between different networks (e.g., between a 3GPP standard network and a WLAN, or the like).

Mobile control (handover) in the conventional mobile communication networks is defined in non-patent document 1 and non-patent document 2, for example. Now, a conventional mobile communication system will be described with reference to FIG. 13. A mobile communication system 9 in FIG. 13 is an embodiment of a mobile communication system described in non-patent document 1.

In mobile communication system 9 in FIG. 13, a plurality of access networks (access network A, access network B) are connected to a core network. A UE (User Equipment; mobile station) 910 is also connected to the core network via an access network. UE 910 is connectable to the core network by way of either access network A or access network B.

Here, access network A is a communication path for which QoS can be set, for example a network defined by the 3GPP standard. Provided for access network A is an eNB (base station) 950 to which UE 910 is connected. UE 910 is connected to the core network via eNB 950 and a gateway SGW (Serving GW) 940.

Further, a PGW (Packet Data Gateway: control station) 920 forwarding communication data to UE 910 is installed in the core network. PGW 920 is connected to access network A via SGW 940.

Further, provided for the core network is a MME (Mobility Management Entity: management station) 930 which receives a request for transfer path establishment from UE 910 and takes control of the procedure of establishing an EPS bearer as a transfer path between UE 910 and PGW 920 via eNB 950 and SGW 940. The EPS bearer is a transfer path between UE 910 and PGW 920 by way of access network A.

On the other hand, access network B is provided with an AR (Access Router) 960 to which UE 910 connects, so that UE 910 is connected with PGW 920 in the core network via AR 960 by establishing a transfer path based on DSMIPv6 (Dual-Stack MIPv6) (e.g., see non patent document 3).

UE 910 is connected to PGW 920 by a transfer path, either the DSMIPv6 transfer path or the EPS bearer. A similar transfer path is established at a UE at the other communication end, so that communication between UEs are performed using respective communication paths via PGW 920.

Further, there is a defined handover procedure relating to a case where communication that UE 910 is transmitting/receiving by way of the DSMIPv6 transfer path via access network B is changed over to the bearer transfer path via access network A to continue communication.

PRIOR ART DOCUMENTS

Non-Patent Document

Non-Patent Document 1: T523.402 Architecture enhancements for non-3GPP accesses
Non-Patent Document 2: TS23 401 General Packet Radio Service (GPRS) enhancements for Evolved Universal Terrestrial Radio Access Network (E-UT RAN) access
Non-Patent Document 3: Mobile IPv6 Support for Dual Stack Hosts and Routers, draft-ietf-next-memo-v4traversal-05.txt

SUMMARY OF THE INVENTION

Problems to be Solved by the Invention

The transmission capacity of the communication path in the conventional mobile communication system (packet communication system) was low in speed while there were no applications that essentially need broadband communication. Therefore, it was not necessary to perform complicated control such as to providing for each application an individual communication path allotted with a bandwidth required for that application.

However, in recent years, applications have become diversified with the explosive spread of the internet. Various types have become general, such as WEB access, FTP and the like that do not need to secure bandwidth which is equal or greater than a predetermined value, voice communication and the like that do not need a large bandwidth but need to have the least minimum bandwidth, and those, such as video distribution and others, that have difficulty in operation if a large bandwidth is not assured.

If a transfer path can be secured for an application in conformity with the characteristic of that application, it is possible to prevent a transfer path having a too large bandwidth from being allotted to an application that does not need to have that large bandwidth, and it is also possible to allot a large enough bandwidth to an application that does need to have a large bandwidth, thus making it possible to make efficient use of the band.

Also in the above-described conventional technology, schemes of performing communication by establishing a bearer as a communication path that satisfies the QoS levels needed by applications, have become offered, so that technologies that satisfy both the efficient band usage and maintenance of communication quality have come to be established.

However, there still exists an insufficient part in performing a handover function while keeping quality, in the network in which a UE connects to a core network via an access network having a QoS guarantee function and a plurality of access networks having a QoS guarantee function.

In the above-described conventional technology, when UE 910 that is performing communication by way of DSMIPv 6 transfer path via access network B performs a handover to access network A, it was necessary to establish a bearer as a communication path via access network A first and change all of communications that UE 910 is making, from the DSMIPv6 communication path to the bearer communication path at a time.

Here, it is possible to presume a situation in which UE 910 is performing a plurality of flows of communication through the DSMIPv6 communication path. A flow is a communication classification that can be identified based on the application or the party at the other end. For example, an application such as a voice communication or WEB access can be identified as a different flow.

In conventional handovers, the communication paths of UE 910 and PGW 920 were not controlled as to flows, and it was necessary to hand over all the flows of a UE by changing the communication paths all at once at the time of a handover. Specifically, when a handover is performed from a state in which a voice communication flow 'a' and a WEB access flow 'b' are being practiced through the DSMIPv6 transfer path, a bearer as a communication path via access network A is established first, then the communication paths for flow 'a' and flow 'b' are changed over in UE 910 and PGW 920 from the DSMIPv6 transfer path to the bearer transfer path to achieve a handover. That is, the bearer communication path and the DSMIPv6 transfer path could not be held simultaneously.

Access network A and access network B can be constructed of different access networks, such as LTE (Long Term Evolution), radio LAN and the like, and these networks are different in transmission rate, presence or absence of QoS and other performance. On the other hand, applications are different in demanded transmission rate, necessity of QoS and other characteristics, depending on the property of each application. Accordingly, the suited access network is different depending on the flow, but in the prior art, there was no means that controls the transfer paths for flows, so that it was impossible to hand over a specific flow alone.

Further, in the prior art, defined as the bearers of the transmission paths to be established via access network A are a default bearer (EPS bearer 1) that does not guarantee QoS and is not for a specific flow, and a specific EPS bearer (EPS bearer 2) that guarantees QoS for specific flows.

However, since, in the prior art, it is impossible to perform a handover by a unit of flow, no consideration as to QoS is given. When a handover from the DSMIPv6 transfer path is performed, it is necessary to establish the default bearer and then perform a handover to the default bearer. It is possible to establish a specific EPS bearer after continuation of communication through the default bearer so as to enable communication through the specific EPS bearer that satisfies the necessary QoS for the flow. However, since it is necessary to temporarily perform communication using the default bearer that does not satisfy the QoS level, there occurs the problem that the quality of the flow is markedly degraded at that time.

In the above way, in the prior art, it was impossible to perform a handover by a unit of flow to an access network capable of performing bearer communication, hence there has been the problem that it is impossible to implement a handover of a flow to the bearer with its QoS maintained even though a bearer that supports the QoS can be established.

In view of the above-described problem, it is therefore an object of the present invention to provide a mobile communication system or the like in which when a mobile station performs a handover, a specific flow among a plurality of flows is selected and directly handed over to a bearer communication path so as to be able to achieve a handover while keeping communication quality.

Means for Solving the Problems

In view of the above problems, a control station of the present invention is a control station which is set with: a mobile station connectable to a first access network capable of establishing a bearer transfer path that guarantees a predetermined QoS and a second access network different from the first access network; and a path for performing communication of a plurality of flows by way of the second access network, the control station comprising: a bearer establishment means for establishing a bearer on the first access network when the control station receives a handover request for a handover from the second access network to the first access network, from the mobile station; a specific bearer establishment means that receives a specific bearer establishment request including information on a flow for which a QoS is guaranteed, from the mobile station, and establishes a specific bearer that guarantees the QoS of the flow, based on the specific bearer establishment request; and a path setting means that sets up a path for performing communication of the flow between the mobile station and the control station, on the specific bearer.

The control station of the present invention is characterized in that for other than the flow included in the specific bearer establishment request, communication is continued through the path set on the second access network.

The control station of the present invention is characterized in that the specific bearer establishment means establishes the specific bearer when a position register request that the mobile station transmits after a handover includes information on a flow for which QoS is guaranteed.

The control station of the present invention is characterized in that a management station that receives an attach request as a handover request from the mobile station and transmits a bearer establishment request to the control station in accordance with the attach request, is connected to the first network, and, the bearer establishment means, when receiving the bearer establishment request from the management station, establishes a bearer on the first access network.

The control station of the present invention is characterized in that a management station that receives the specific bearer establishment request from the mobile station and transmits the specific bearer establishment request to the control station, is connected to the first network, and, the specific bearer establishment means, when receiving the specific bearer establishment request from the management station, establishes the specific bearer that guarantees the QoS of the flow.

A control station of the present invention is a control station which is set with a mobile station connectable to a first access network capable of establishing a bearer transfer path that guarantees a predetermined QoS and a second access network different from the first access network, and a path for performing communication of a plurality of flows by way of the second access network, the control station comprising: a handover request receiving means that receives a handover request for the mobile station to perform a handover from the second access network to the first access network, the handover request including information on a flow for which QoS is guaranteed; a specific bearer establishment means that establishes a specific bearer that guarantees the QoS of the flow, based on the handover request; and, a path setting means that sets up a path for performing communication of the flow between the mobile station and the control station, on the specific bearer.

Further, a mobile station of the present invention is a mobile station which is connectable to a first access network capable of establishing a bearer transfer path that guarantees a predetermined QoS and a second access network different from the first access network, and is set with a path for performing communication of a plurality of flows by way of the second access network and a control station, the mobile station comprising: a handover request transmitting means that transmits a handover request to the control station when the mobile station is handed over from the second access network to the first access network; and, a specific bearer request means for requesting the control station to establish a specific bearer that guarantees the necessary QoS for a flow.

The mobile station of the present invention is characterized in that an attach request transmitted by the handover request transmitting means is transmitted including information on a flow for which QoS is guaranteed.

A mobile communication system of the present invention is a mobile communication system comprising: a mobile station connectable to a first access network capable of establishing a bearer transfer path that guarantees a predetermined QoS and a second access network different from the first access network; and a control station set with a path for performing communication of a plurality of flows by way of the second access network, the control station comprising: a bearer establishment means for establishing a bearer on the first access network when the control station receives a handover request for performing a handover from the second access network to the first access network, from the mobile station, the mobile station comprising: a handover request transmitting means that transmits the handover request to the control station when the mobile station performs the handover from the second access network to the first access network; and, a specific bearer request means for requesting the control station to establish a specific bearer that guarantees the necessary QoS for a flow, the control station further comprising: a specific bearer establishment request receiving means for receiving a specific bearer establishment request, including information on a flow for which QoS is guaranteed; a specific bearer establishment means for establishing a specific bearer that guarantees the QoS of the flow, based on the specific bearer establishment request; and a path setup means for setting up a path for performing communication of the flow between the mobile station and the control station, on the specific bearer.

A mobile communication method of the present invention is a mobile communication method including: a mobile station connectable to a first access network capable of establishing a bearer transfer path that guarantees a predetermined QoS and a second access network different from the first access network; and a control station set up with a path for performing communication of a plurality of flows by way of the second access network, the method comprising: the step in which the mobile station transmits a handover request to the control station when the mobile station performs a handover from the second access network to the first access network; the step in which the control station establishes a bearer on the first access network based on the handover request; the step in which the mobile station requests the control station to establish a specific bearer that guarantees the necessary QoS for a flow; the step in which the control station receives the request for the specific bearer and establishes the specific bearer that guarantees the QoS of the flow; and, the step of setting up a path for performing communication of the flow between the mobile station and the control station, on the specific bearer.

Advantages of the Invention

According to the present invention, the control station is set with a mobile station connectable to a first access network capable of establishing a bearer transfer path that guarantees a predetermined QoS and a second access network different from the first access network and a path for performing communication of a plurality of flows by way of the second access network. The control station establishes a bearer on the first access network when receiving a handover request for a handover from the second access network to the first access network, from the mobile station; and receives a specific bearer establishment request including information on a flow for which a QoS is guaranteed, from the mobile station, establishes a specific bearer that guarantees the QoS of the flow, based on the specific bearer establishment request; and sets up a path for performing communication of the flow between the mobile station and the control station, on the specific bearer.

Accordingly, at the time of a handover, a flow for which QoS is guaranteed can be put in communication, not through the bearer established in the first access network, but through a path that is set up on the specific bearer.

According to the present invention, for other than the flows included in the specific bearer establishment request, communication can be continued through the path set on the second access network. Accordingly, it is possible to perform communication by setting paths on both the first access network and the second access network.

BRIEF DESCRIPTION OF THE DRAWINGS

[FIG. 4] is a diagram for illustrating one data configuration example of flow management tables in the present embodiment.

[FIG. 7] is a diagram for illustrating one data configuration example of flow management tables in the first embodiment.

MODES FOR CARRYING OUT THE INVENTION

Referring next to the drawings, the embodiments of a mobile communication system to which the present invention is applied will be described in detail.

1. Network Configuration

Figure 1:
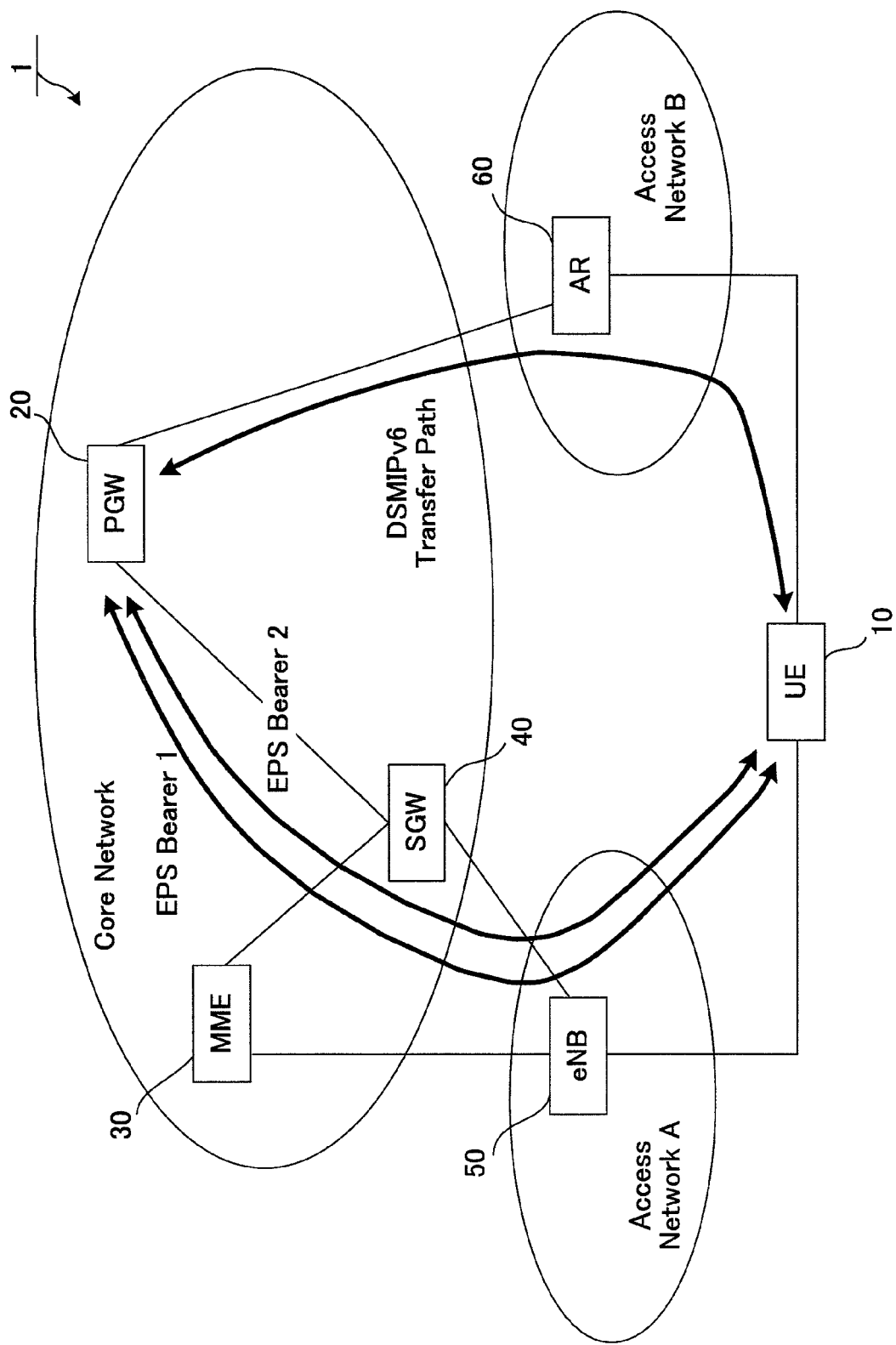
[FIG. 1] is a diagram for illustrating the overall scheme of a mobile communication system in the present embodiment.

To begin with, the network configuration in the present embodiments will be described with reference to FIG. 1. FIG. 1 is a diagram for illustrating the overall scheme of a mobile communication system 1 when the present invention is applied. As shown in this figure, in the mobile communication system, an access network A and an access network B are connected to a core network. Here, access network A and access network B are assumed to be different networks; for example, access network A is assumed to be a 3GPP standardized network while access network B is assumed to be a non-3GPP network (e.g., DSMIPv6) as an example.

First, a UE 10 (mobile station: User Equipment) is connected to the core network via a plurality of radio access networks. Access network A includes a base station (eNB 50) to which UE 10 connects and is connected to the core network via a gateway (SGW 40).

The core network is installed with a GW (PGW 20) that forwards the communication data transmitted from other mobile stations to a mobile station and is connected to SGW 40. Further, the core network is installed with a management apparatus (MME 30) that receives a request for transfer path establishment from UE 10 and takes control of the procedure for establishing a bearer (EPS bearer) as a transfer path between UE 10 and PGW 20 via eNB 50 and SGW 40. The EPS bearer is a QoS-supporting transfer path between UE 10 and PGW 20 by way of access network A.

Access network B is installed with an access router (AR 60) to which UE 10 connects, so that UE 10 is connected with PGW 20 in the core network via AR 60 by establishing a transfer path based on DSMIPv6.

Access network A is, for example a LTE (Long Term Evolution) as a radio access network that is defined by 3GPP as a communication standardization organization for mobile phone networks. Access network B is an access network such as a radio LAN, WiMAX or the like. The core network is based on SAE (System Architecture Evolution) defined by 3GPP.

As above, in the mobile communication system using packet communication in the present embodiment, UE 10 is connected to the core network by the transfer path of the bearer that supports QoS via access network A and by the transfer path based on DSMIPv6 via access network B.

2. Equipment Configurations

Subsequently, each apparatus configuration will be briefly described with reference to the drawings. Here, SGW 40, MME 30, eNB 50 and AR 60 have the same configurations as those of the conventional equipment in SAE, so that detailed description is omitted.

2.1 UE Configuration

First, the configuration of UE 10 as a mobile station will be described using a block diagram in FIG. 2. Here, as a specific example of UE 10, a terminal such as mobile terminal, PDA or the like, which simultaneously connects to the core network via a plurality of access networks, is supposed.

Figure 2:
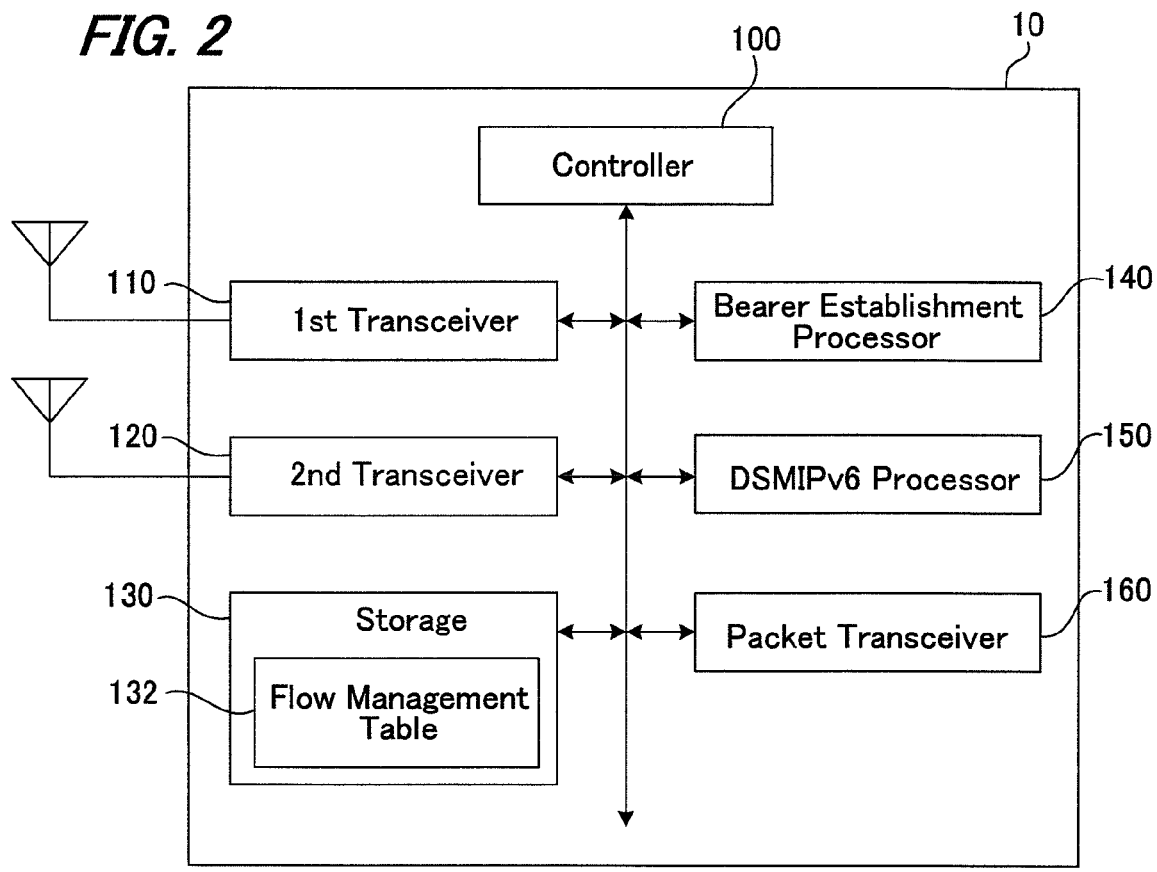
[FIG. 2] is a diagram for illustrating the configuration of a UE (mobile station) in the present embodiment.

As shown in FIG. 2, UE 10 includes a controller 100, a first transceiver 110, a second transceiver 120, a storage 130, a bearer establishment processor 140, a DSMIPv6 processor 150 and a packet transceiver 160.

Controller 100 is a functional unit for controlling UE10. Controller 100 reads out and executes various programs stored in storage 130 to realize processes.

First transceiver 110 and second transceiver 120 are functional units for enabling UE 10 to access each access network. First transceiver 110 is the functional unit for connection to access network A and second transceiver 120 is the functional unit for connection to access network B. Connected to first transceiver 110 and second transceiver 120 are external antennas, respectively.

Storage 130 is a functional unit for storing programs, data, etc., necessary for UE 10 to perform various kinds of operations. Storage 130 further stores a flow management table 132 for storing flow information for identifying applications in association with transfer paths for transmission. This flow management table 132 is referred to when packet transceiver 160 transmits data so as to select a transfer path for each flow, whereby the data is transmitted from the transceiver corresponding to the transfer path.

Here, FIG. 4(*a*) shows one data configuration example of the flow management table. As shown in FIG. 4(*a*), a flow (e.g., "flow 1 (TFT1, FlowID1)" is stored corresponding to a transfer path (e.g., "DSMIPv6 transfer path").

Bearer establishment processor 140 is a functional unit that executes a process for establishing an EPS bearer as a communication path to PGW 20 via access network A, by way of SGW 40.

DSMIPv6 processor 150 is a functional unit for establishing a transfer path based on DSMIPv6 to connect to the core network via access network B. Packet transceiver 160 is a functional unit that transmits and receives specific data (packets). The unit decomposes the data received from the upper layer into packets to be transmitted. The unit also realizes a function of transferring received packets to the upper layer.

2.2 PGW Configuration

Figure 3:
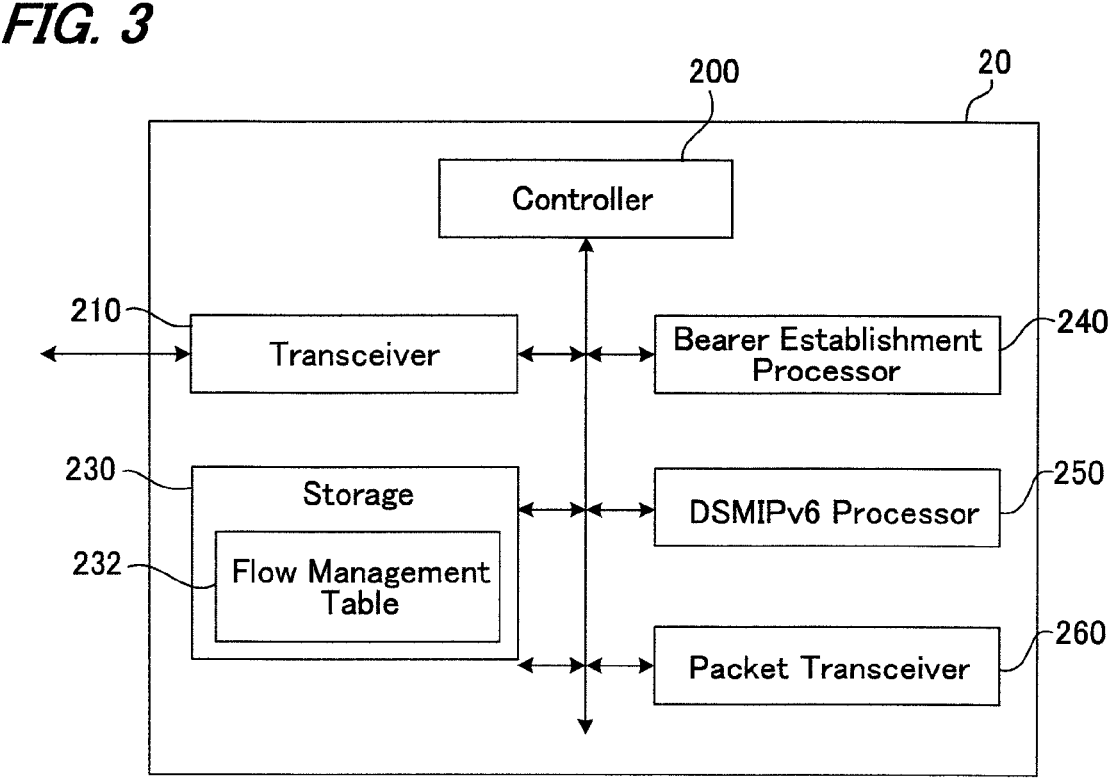
[FIG. 3] is a diagram for illustrating the configuration of a PGW in the present embodiment.

Next, the configuration of PGW 20 in the present embodiments will be described based on FIG. 3. PGW 20 includes a controller 200, a transceiver 210, a storage 230, a bearer establishment processor 240, a DSMIPv6 processor 250 and a packet transceiver 260.

Transceiver 210 is a functional unit that is wired to a router or a switch to transmit and receive packets. For example, this unit performs transmission and reception using Ethernet (registered trademark) that is usually used as a network connecting system, or the like.

Storage 230 is a functional unit for storing programs, data, etc., necessary for PGW 20 to execute various operations. Storage 230 further stores a flow management table 232 for storing flow information for identifying applications in association with transfer paths for transmission. Flow management table 232 is referred to when packet transceiver 260 transmits data so as to select a transfer path for each flow, whereby the data is transmitted from the transceiver corresponding to the transfer path.

Here, FIG. 4(*b*) shows one data configuration example of the flow management table. As shown in FIG. 4(*b*), a flow (e.g., "flow 1 (TFT1, FlowID1)" is stored corresponding to a transfer path (e.g., "DSMIPv6 transfer path").

Bearer establishment processor 240 is a functional unit that executes a process for establishing an EPS bearer as a communication path to UE 10 via access network A, by way of SGW 40.

DSMIPv6 processor 250 is a functional unit for establishing a transfer path based on DSMIPv6 to connect to UE 10 via access network B. Packet transceiver 260 is a functional unit that transmits and receives specific data (packets).

3. Communication Path Establishment Procedure

Figure 5:
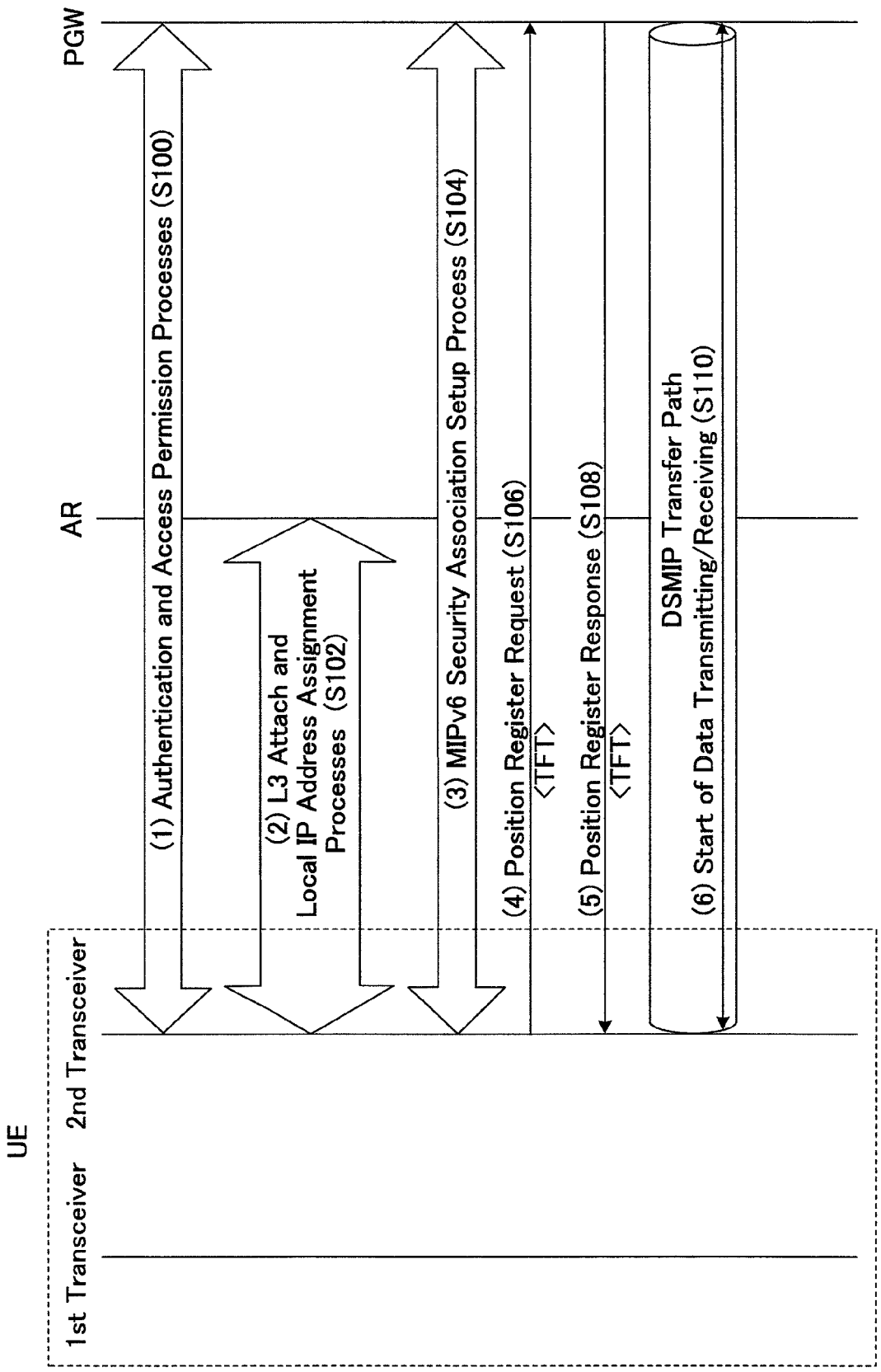
[FIG. 5] is a diagram for illustrating the procedure of communication path establishment in the present embodiment.

Next, in the network shown in FIG. 1, the procedures of UE 10, AR 60 and PGW 20 when UE 10 connects to the core network via access network B to establish a DSMIPv6 communication path, will be described using a sequence diagram in FIG. 5. Here, UE 10 transmits and receives control information by means of second transceiver 120 connected to access network B to achieve the procedure.

(1) First, UE 10 performs an authentication procedure for acquiring a local IP address from access network B (S100). The procedure is executed by the combination of the procedure between UE 10 and AR 60 and the procedure between AR 60 and PGW 20, as the method conventionally done for DSMIPv6. AR 60 is installed in the coverage area for UE 10, and is the AR that UE 10 connects. PGW 20 is an entity that is selected based on the information previously held by UE 10. An authentication and access permission processes are performed by PGW 20 or AR 60, using the profiles such as the identification information of UE 10, the subscriber data, etc., based on the service policy.

(2) Then, the UE 10 that is authorized and permitted to access is assigned a local IP address by AR 60, as in the conventional method of DSMIPv6 (S102). The assigned local IP address is an IPv4 or IPv6 address, and is used as CoA (Care-of-Address) of DSMIPv6. The method of assignment is implemented based on DHCP that is widely used in the Internet or a stateless IP address assignment procedure.

(3) A setup process for establishing security association for transmitting/receiving encrypted DSMIPv6 control messages between UE 10 and PGW 20 is implemented (S104). This process is performed based on IKEv2, EAP or the like, following the conventional DSMIPv6 technique.

At this step, PGW 20 gives notice of an IPv6 Address or IPv6 network prefix to UE 10. UE 10 sets the assigned IPv6 address as HoA (Home Address). When a network prefix is assigned, HoA is generated based on that network prefix. By this procedure, UE 10 becomes able to perform a position registering process in safety, to PGW 20, using an encrypted control message.

(4) UE 10 transmits a position register request defined in DSMIPv6 to PGW 20 (S106). The message includes the identification information of UE 10, HoA of UE 10 and CoA as positional information. UE 10 can also make a request for assignment of HoA in IPv4 address, by this message based on DSMIPv6.

Here, UE 10 transmits a position register request including flow information for which communication is performed using a DSMIPv6 transfer path to be generated. The flow information is information that enables distinction between applications, and the TFT (Traffic Flow Template) formed of an IP address, port number and protocol number can be used.

Further, it is possible to use a flow ID as the flow information when both UE 10 and PGW 20 share 'TFTs' and 'flow IDs for identifying TFTs in advance. Further, the position register request may include a plurality of flow information.

In the present embodiment, the request is transmitted including flow 1 identified by TFT1 and flow 2 identified by TFT2. For example, flow 1 may be for an application such as voice communication and flow 2 may be for an application such as WEB access or the like.

(5) PGW 20 establishes a DSMIPv6 transfer path and transmits a position register response to UE 10 (S108). The position register response includes HoA and CoA. It is also possible to assign HoA in an IPv4 address by the request in (4) (the request at S106). Further, the UE having received the position register response also completes a transfer path establishment process.

(6) UE 10 and PGW 20 start data transmitting/receiving through the established DSMIPv6 transfer path (S110). That is, in DSMIPv6 transfer path, a path is set up between PGW 20 and UE 10.

By the steps as above, the DSMIPv6 transfer path is established between UE 10 and PGW 20. In PGW 20, the transfer path for transmitting flows of UE 10 is controlled by making the flows correspondent to the transfer path established by DSMIPv6, as shown in FIG. 4(*b*). Specifically, flow 1 and flow 2 are controlled so as to be transmitted to UE 10 through DSMIPv6 transfer path.

Similarly, in UE 10, the transfer path for transmitting flows of UE 10 is controlled by making the flows correspondent to the transfer path established by DSMIPv6, as shown in FIG. 4(*a*). Specifically, flow 1 and flow 2 are controlled so as to be transmitted to UE 10 through DSMIPv6 transfer path. In UE 10 and PGW 20, when packets are transmitted, packets are transmitted by referring to the flow management table to select a transfer path corresponding to the flow of transmission data. The same procedure is implemented at the other end of UE 10, so that communication between mobile stations is enabled by way of PGW 20.

Thereafter, if communication of an additional flow is wanted through the DSMIPv6 transfer path, it is possible to perform registration of the flow by implementing a position registering procedure added with flow information.

4. Handover Procedure

Next, the procedure when a mobile station is handed over from access network B to access network A will be described.

4.1 The First Embodiment

To being with, the first embodiment will be described with reference to FIGS. 6 to 9.

4.1.1 Attachment Type 1 Case

Figure 6:
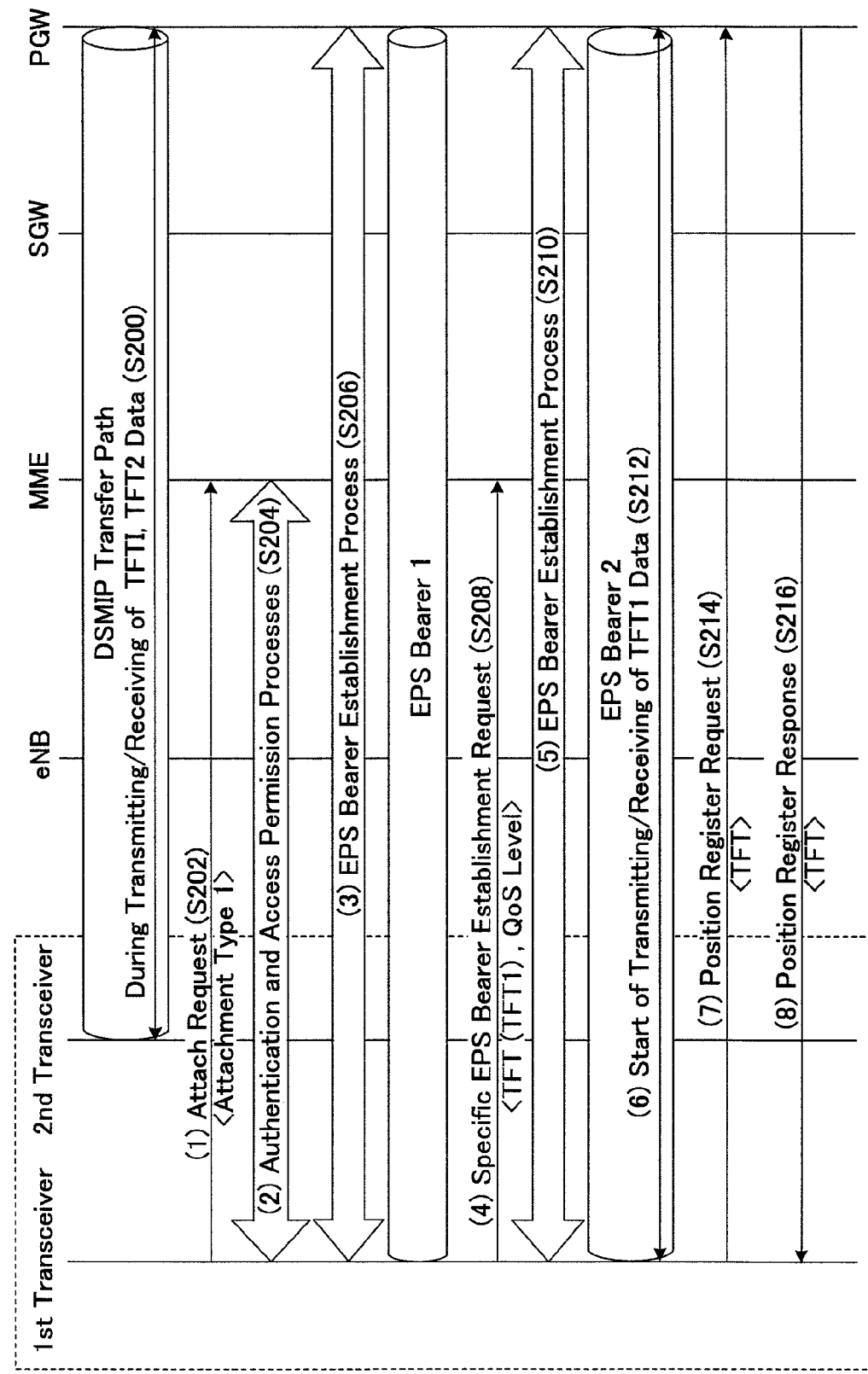
[FIG. 6] is a diagram for illustrating the processing flow in the first embodiment.

First, description will be given with reference to FIG. 6. As the initial state at the time of a handover, UE 10 is performing communication of flow 1 and flow 2 through the DSMIPv6 transfer path by way of access network B (S200). At the time of a handover, UE 10 enters the coverage area of base station (eNB 50) of access network A and performs a handover procedure for transmitting/receiving the control messages by means of first transceiver 110.

(1) Following the conventional method, UE 10 transmits a handover request. Specifically, UE 10 sends an attach request to MME 30 first (S202). The attach request includes identification information on UE 10 for authenticating UE 10 and permitting access. This also includes an access point name (APN) for identifying the PGW 20 to be connected to.

Here, the difference from the prior art is that UE 10 can give notice of a new attachment type, by use of an information element of the attach request. The new attachment type represents making a request for a handover of a specific flow that is communicated through another access network. This indicates a request that PGW 20 will not transmit packets to UE 10 through the default bearer as the transfer path that is established first in the conventional handover procedure.

On the other hand, since the conventional attach request at the time of a handover does not perform control by a unit of flow, all the flows that UE 10 is communicating are handed over. The following description will be given assuming that attachment type "1" is the new attachment type and attachment type "2" is a conventional attach request. That is, Attachment type 1: an attachment that represents a handover from another access network and performing a handover of a specific flow Attachment type 2: an attachment that represents a handover from another access network and performing a handover of all the flows.

As a specific method of notifying the attachment type, a new flow handover flag (which will be referred to hereinbelow as "F flag") is defined in the attach request such that setting "F flag" "ON" can indicate attachment type "1" and setting "F flag" "OFF" can indicate attachment type "2". First, FIG. 6 illustrates an example where an attach request in attachment type "1" is made.

(2) MME 30 having received the attach request executes an authentication and access permission processes by performing a procedure between UE 10 and eNB 50, following the conventional method (S204). MME 30 performs authentication and access permission based on subscriber identification information and the like of UE 10 included in the attachment information.

(3) MME 30 executes an establishment process of the default EPS bearer (EPS bearer 1) for UE 10 that was permitted to connect (S206). The procedure is performed following the conventional procedure, by transmitting/receiving control messages between UE 10, eNB 50, MME 30, SGW 40 and PGW 20.

Specifically, MME 30 having received an attach request, transmits a default EPS bearer establishment request to PGW 20. PGW 20, as receiving the default EPS bearer establishment request, executes a process of establishing an EPS bearer. Herein, the difference from the prior art is that the default EPS bearer establishment request includes the attachment type (attachment type "1" in this case) included in the attach request. Here, the default EPS bearer is not a transfer path that satisfies the QoS level required by the specific flow but a transfer path for enabling communication between UE 10 and PGW 20.

(4) After establishment of the default EPS bearer, UE 10 transmits a specific EPS bearer establishment request to MME 30 (S208). The message herein includes, as the information on a flow to be handed over, flow identification information and its QoS level. The flow identification information is information that enables identification of the application and can use the TFT (Traffic Flow Template) formed of an IP address, port number and protocol number. It is also possible to use the flow ID as the flow information when both UE 10 and PGW 20 have shared flow IDs identifying TFTs in advance. With this, UE 10 gives notice of the flow for which a handover is demanded and the QoS level corresponding to the flow (the QoS level to be guaranteed for the flow). In the present embodiment, as the TFT included in the flow identification information, "TFT1" is specified.

(5) MME 30 receives the specific EPS bearer establishment request from UE 10 and executes an establishment process of a specific EPS bearer (EPS bearer 2) (S210). The procedure for the EPS bearer establishment process is executed following the conventional procedure, by transmitting a specific EPS bearer establishment request from MME 30 to PGW 20 and then transmitting/receiving control messages between UE 10, eNB 50, MME 30, SGW 40 and PGW 20. The specific EPS bearer is a transfer path that guarantees the QoS level required for the specific flow requested by UE 10 and a transfer path for enabling communication between UE 10 and PGW 20.

(6) PGW 20 transmits a flow (TFT1) selected by the request of UE 10 from the flows of UE 10 having been transmitted through the DSMIPv6 transfer path, by the transfer path of EPS bearer 2, to UE 10. That is, for the selected flow (TFT1) a path is set up in EPS bearer 2 so that data transmission/reception of TFT1 is started by use of the transfer path of EPS bearer 2 (S212).

As described above, though in the conventional handover, in performing a handover it was necessary to perform a handover once to the default EPS bearer that does not satisfies the QoS level, it is possible to perform a handover to the specific EPS bearer that guarantees the QoS level necessary for the flow, without using the default EPS bearer. Accordingly, it becomes possible to switch the transfer path without degrading communication quality in the application.

Specifically, UE 10 transmits a specific EPS bearer establishment request by specifying flow 1 (TFT1) to establish EPS bearer 2 that guarantees the QoS level of flow 1. FIG. 7(a) shows a flow management table 132 of UE 10 in this case. FIG. 7(b) shows a flow management table 132 of PGW 20. In this way, the transfer path of flow 1 is updated to EPS bearer 2 in UE 10, and the transfer path of flow 1 is updated to EPS bearer 2 in PGW 20.

In transmitting packets, in UE 10 and PGW 20, packets are transmitted by identifying the flow based on the transmission data with reference to the flow management table so as to select the transfer path corresponding to the flow. On the other hand, flow 2 that is not included in the specific EPS bearer establishment request is kept communicating through the DSMIPv6 transfer path.

(7) After establishment of the specific EPS bearer UE 10 transmits a position register request to PGW 20, based on DSMIPv6 (S214). The message includes the identification information of UE 10, HoA of UE 10 and CoA as positional information. Further, UE 10 transmits the flow information for performing communication using the established DSMIPv6 transfer path, with the position register request.

(8) PGW 20 transmits a position register response to UE 10 to complete the position registering process of DSMIPv6 (S216).

As a result of the above procedure, it becomes possible to perform a handover of a unit of flow from access network B to access network A while keeping the QoS. In the prior art, when a plurality of flows proceed in communication, all the flows have to be handed over at once. Hence it was impossible to select an access network (transfer path) suited to each of the flows.

Accordingly, as a result of the present embodiment, for example an access network having a large enough bandwidth is selected for a flow that needs a greater bandwidth while other access networks are allotted to other flows, whereby it is possible to make use of transmission path more suited to flow, and hence use resources efficiently.

Here, though it was assumed that switching of transfer paths at PGW 20 is implemented immediately after establishment of the specific EPS bearer at S210, the switching may also be triggered by the position registering procedure of DSMIPv6 shown at S214 and S216.

Further, though description was made that the position register request/response are given after establishment of the specific EPS bearer (EPS bearer 2), position register complete notice/response from PGW 20 to UE 10 may also be given. That is, PGW 20 transmits a position register complete notice that indicates that position registration of UE 10 after a handover is completed, to UE 10. UE 10 transmits a response signal that acknowledges the reception of the position register complete notice, to PGW 20. Further, switching of transfer paths at PGW 20 may be triggered by the position register complete notice/response procedure from PGW 20 to UE 10.

4.1.2 Attachment Type 2 Case

Figure 8:
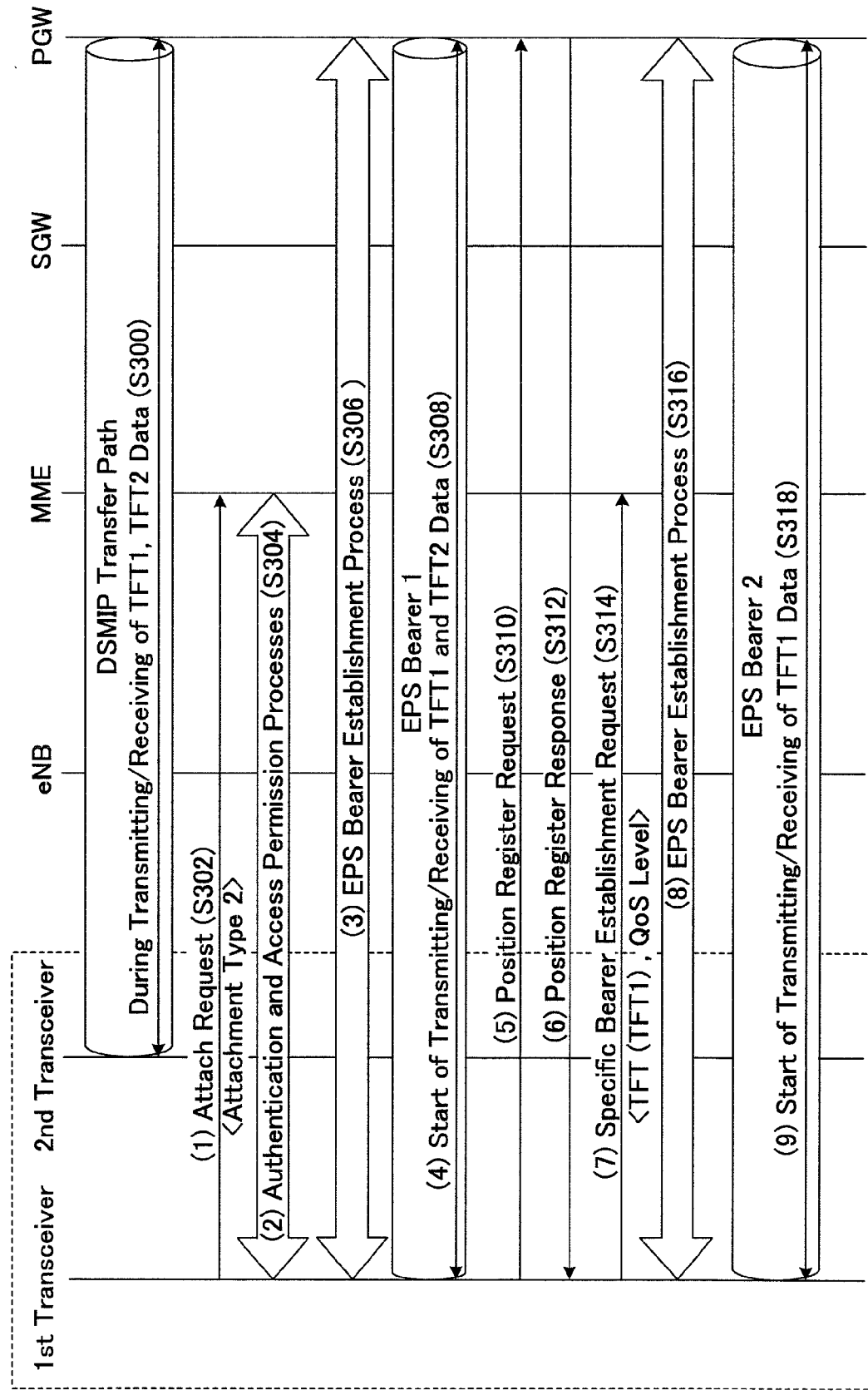
[FIG. 8] is a diagram for illustrating the processing flow in the first embodiment.

Subsequently, a case when the attachment type is "2" will be described with reference to FIG. 8.

As the initial state at the time of a handover, UE 10 is performing communication of flow 1 (TFT1) and flow 2 (TFT2) through the DSMIPv6 transfer path by way of access network B (S300) as a result of the communication path establishment procedure described heretofore. At the time of a handover, UE 10 enters the coverage area of base station (eNB 50) of access network A and transmits a handover request by a control message using first transceiver 110 to execute a handover procedure.

(1) UE 10 transmits an attach request as a handover request to MME 30, following the conventional method (S302). The attach request includes identification information on UE 10 for authenticating UE 10 and permitting access. This also includes an access point name (APN) for identifying the PGW 20 to be connected to. Here, UE 10 makes an attach request as attachment type "2" by non-inclusion of F-flag.

(2) Similarly to (2) for attachment type "1", an authentication and access permission processes are executed (S304).

(3) Similarly to (3) for attachment type "1", MME 30 executes an establishment process of the default EPS bearer (EPS bearer 1) for UE 10 that was permitted to connect (S306). Thereby, the default EPS bearer (EPS bearer 1) is establishment between UE 10 and PGW 20. That is, MME 30 having received the attach request, transmits a default EPS bearer establishment request to PGW 20. The default EPS bearer establishment request includes the attachment type (attachment type "2" in this case) included in the attach request.

(4) Since the attach type is "2", the paths for flow 1 and flow 2 are set up for PGW 20 by way of EPS bearer 1. That is, data transmission/reception of flow 1 and flow 2 (TFT1 and TFT2) is started in EPS bearer 1 (S308).

(5) UE 10 transmits a position register request to PGW 20 after establishment of the specific EPS bearer (S310).

(6) PGW 20 transmits a position register response to UE 10 to complete the position registering process (S312).

(7) After establishment of the default EPS bearer, UE 10 transmits a specific EPS bearer establishment request to MME 30 (S314). The message herein is adapted to include, as the information on the flow, flow identification information and QoS level. In the present embodiment, as the TFT included in the flow identification information, "TFT1" is specified.

(8) MME 30 receives the specific EPS bearer establishment request from UE 10 and executes an establishment process of a specific EPS bearer (EPS bearer 2) (S316). The procedure is performed following the conventional procedure, by transmitting/receiving of control messages between UE 10, eNB 50, MME 30, SGW 40 and PGW 20.

(9) PGW 20 transmits a flow (TFT1) selected by the request of UE 10 from the flows of UE 10 having been transmitted and received through EPS bearer 1, to UE 10 through the transfer path of EPS bearer 2. Thereby, a path for TFT1 is set up in EPS bearer 2 so that data transmission/reception of TFT1 is started by use of the transfer path of EPS bearer 2 (S318).

In this way, according to the present embodiment, by setting the attachment type to be "2", it is possible to implement a similar process even if the process is a conventional one in which all the flows are transferred once to the default EPS bearer, followed by transfer to the specific EPS bearer.

4.1.3 Processing Flow in Control Station

Figure 9:
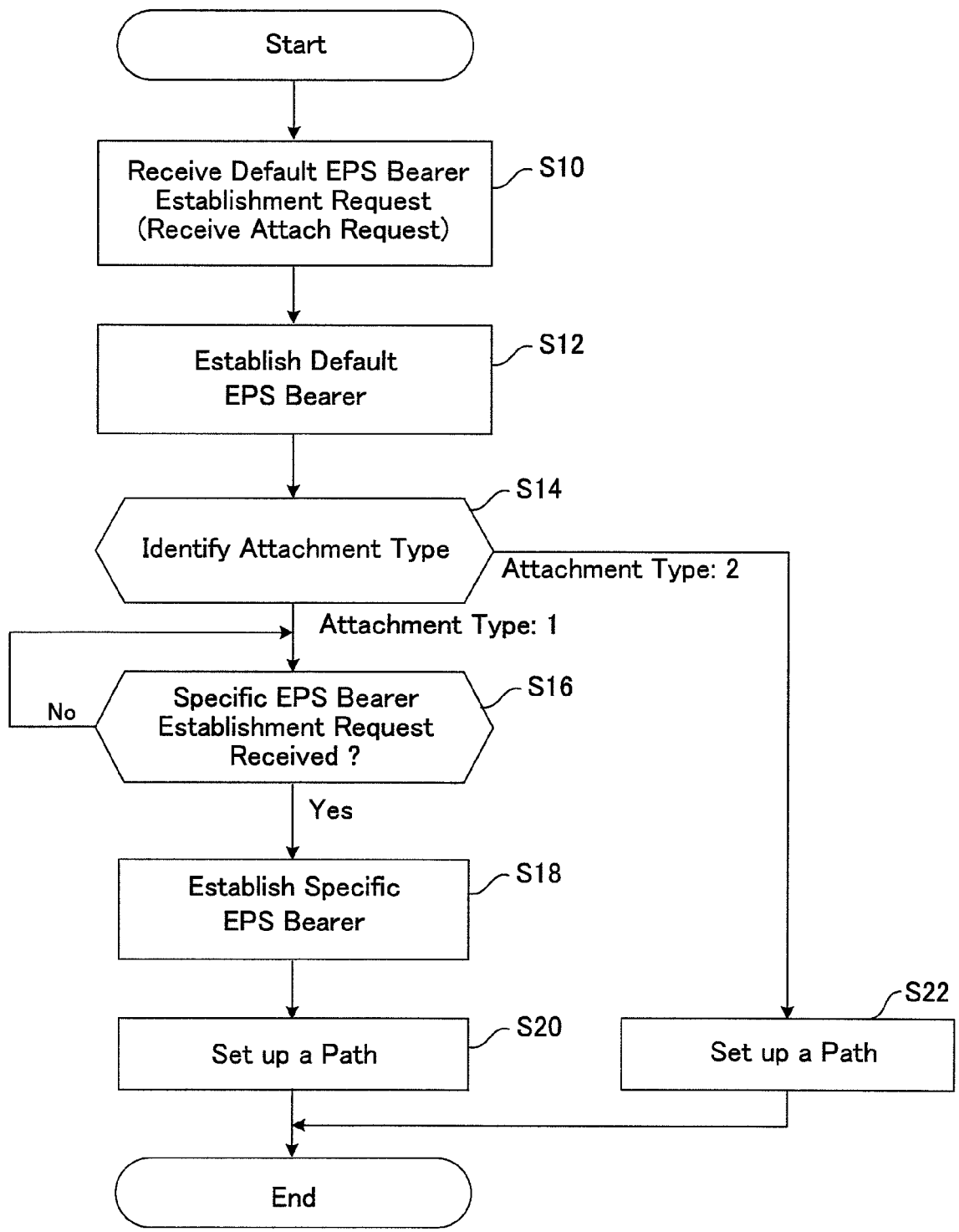
[FIG. 9] is a flow chart for illustrating the operation of a PGW in the first embodiment.

Referring now to an operation flow in FIG. 9, the processing in the control station (PGW 20) accompanied by bearer establishment, in the present embodiment will be described.

First, a default EPS bearer establishment request is received (Step S10). In the present embodiment, MME 30 receives an attach request from UE 10 first. MME 30 gives notice of a default EPS bearer establishment request to PGW 20 as the procedure for establishing the default EPS bearer. At this time, the attachment type included in the default EPS bearer establishment request is retained. The default EPS bearer is established in response to this default EPS bearer establishment request so as to establish a transfer path (EPS bearer 1) between PGW 20 and UE 10 (Step S12).

Then, the attachment type indicated by the default EPS bearer establishment request is identified (Step S14).

Here, when the attachment type is "1" (Step S14; attachment type "1"), MME 30 waits for an establishment request for a specific EPS bearer (Step S16). Then, when receiving a specific EPS bearer establishment request from UE 10 (Step S16; Yes), MME 30 establishes a specific EPS bearer (EPS bearer 2) that guarantees QoS (Step S18). Then, PGW 20 sets up a flow path (route) designated by the specific EPS bearer establishment request and starts communication (Step S20).

On the other hand, when the attachment type is "2" in Step S14 (Step S14; attachment type "2"), PGW 20 sets up a flow path (route) on the default EPS bearer and starts communication (Step S22).

In this way, when the attachment type is "2", PGW 20 transmits all the flows of UE 10 that have been transmitted to the DSMIPv6 transfer path, to UE 10 through the specific EPS bearer (EPS bearer 1).

However, this is the same as the conventional handover; even when the flow of UE 10 to be handed over needs a QoS level, communication is performed through the default bearer that does not satisfy the QoS level corresponding to the flow. That is, the flow is transmitted through the transfer path that does not satisfy the necessary quality depending on the application, hence there is a risk of the quality being markedly deteriorated.

In this case, by setting the attachment type to be "1", it is possible to hand over the flow from the DEMIPv6 transfer path to the specific EPS bearer (EPS bearer 2) that is able to guarantee the QoS level without use of the default EPS bearer.

4.2 The Second Embodiment

Figure 10:
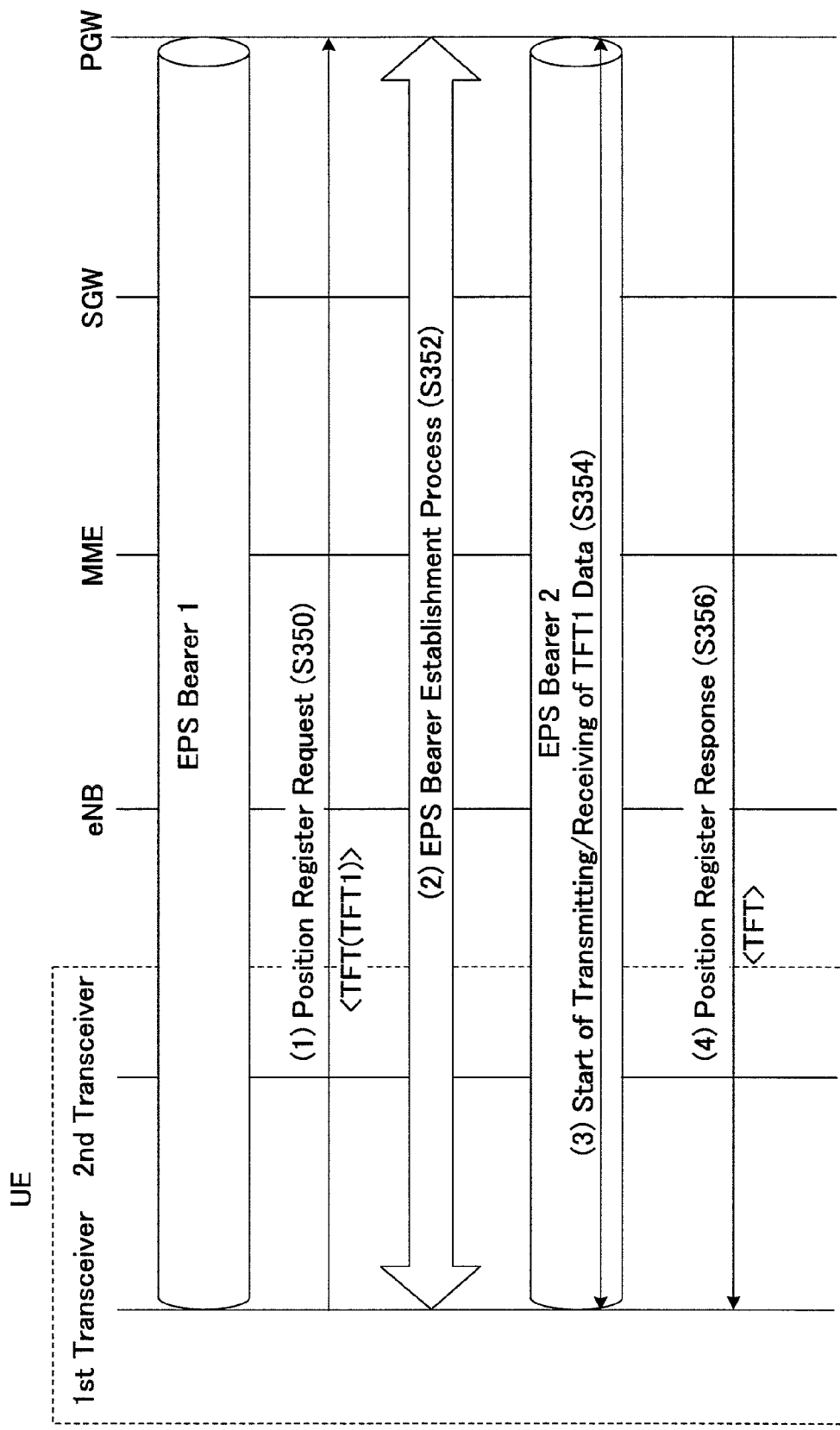
[FIG. 10] is a diagram for illustrating the processing flow in the second embodiment.

Next, the second embodiment will be described with reference to FIG. 10. The network configuration and apparatus configuration of this embodiment are the same as those of the first embodiment, so that detailed description is omitted. Further, since the procedures in which UE 10 connects to a core network via access network B and establishes the DSMIPv6 transfer path for flow 1 and flow 2 are also the same, the description is omitted.

As the initial state at the time of a handover, UE 10 is performing communication of flow 1 and flow 2 through the DSMIPv6 transfer path by way of access network B. At the time of a handover, UE 10 enters the coverage area of eNB 50 of access network A and transmits a handover request by a control message using first transceiver 110 to execute a handover procedure. This handover procedure is the same as the handover procedure described in the first embodiment with reference to FIG. 6 up to the stage where the default EPS bearer is established, or S206. The procedure that follows will be described with reference to FIG. 10.

(1) Differing from the first embodiment, UE 10 transmits a position register request for DSMIPv6 to PGW 20. This position register request demands establishment of a specific EPS bearer (S350). Here, the message of this position register request should include the identification information of UE 1, HoA of UE 10 and CoA as the positional information. Further, UE 10 transmits a position register request including the flow information and a QoS level for performing communication through the DSMIPv6 transfer path to be generated.

(2) PGW 20 having received the position register request implements a process of establishing a specified EPS bearer (EPS bearer 2) (S352). The procedure is performed following the conventional procedure, by transmitting/receiving control messages between UE 10, eNB 50, MME 30, SGW 40 and PGW 20. The specific EPS bearer is a transfer path that guarantees the QoS level required for the specific flow requested by UE 10 and a transfer path for enabling communication between UE 10 and PGW 20.

(3) PGW 20 and UE 10 set up a path for communication of the flow (TFT1 in the present embodiment) present in the position register request. By this setup, the DSMIPv6 transfer path is switched to the specific EPS bearer transfer path to start communication (S354). Communication of the flows other than this is continued through the DSMIPv6 transfer path.

(4) After establishment of the specific EPS bearer, PGW 20 transmits a position register response to UE 10 (S356).

Updating of flow management table 132 of UE 10 and flow management table 232 of PGW 20 and the procedure of switching transfer paths may be done when the specific EPS bearer is established similarly to the first embodiment, or may also be done when the position registering process of DSMIPv6 is completed.

The difference of the present embodiment from the above first embodiment is that in the first embodiment MME 30 takes control of performing establishment of the specific EPS bearer based on the specific EPS bearer establishment request of UE 10 whereas in the present embodiment PGW 20 takes control of establishment based on the position register request of DSMIPv6.

4.3 The Third Embodiment

Next, the third embodiment will be described. The network configuration and apparatus configuration of this embodiment are the same as those of the first embodiment, so that detailed description is omitted. Further, since the procedures in which UE 10 connects to a core network via access network B and establishes the DSMIPv6 transfer path for flow 1 and flow 2 are also the same, the description is omitted.

As the initial state at the time of a handover, UE 10 is performing communication of flow 1 and flow 2 through the DSMIPv6 transfer path by way of access network B. At the time of a handover, UE 10 enters the coverage area of eNB 50 of access network A and transmits a handover request by a control message using first transceiver 110 to execute a handover procedure. The handover procedure in the present embodiment will be described with reference to FIG. 11.

(1) Initially, UE 10 and PGW 20 are transmitting/receiving data for flow 1 (TFT1) and flow 2 (TFT2) through the DSMIPv6 transfer path (S400).

(2) Then, an attach request is transmitted from first transceiver 110 of UE 10 to MME 30 (S402). The difference from the first embodiment is that UE 10 requests an authentication process alone by attachment type "1" in link with attachment and notifies that there is no need of establishment of the default EPS bearer. Thereby, MME 30 performs an authentication procedure as receiving the attach request but do not perform a procedure of establishing the default EPS bearer.

(3) MME 30 having received the attach request, performs an authentication and access permission processes by the procedure between UE 10 and eNB 50 following the conventional method (S406). MME 30 performs the authentication and access permission processes based on the subscriber identification information and the like of UE 10 included in the attach request. Thereafter, MME 30 waits for receiving a specific EPS bearer establishment request from UE 10.

(4) When permitted to access, UE 10 transmits a specific EPS bearer establishment request to MME 30 (S408). Here, the message of the specific EPS bearer establishment request is transmitted including, as the information on the flow, flow identification information (TFT1) and QoS level.

Thereby, an EPS bearer establishment process is implemented (S410) so that a specific EPS bearer (EPS bearer 2) is established between UE 10 and PGW 20. Then, a path is set up on the established EPS bearer 2 so that transmitting/receiving of "TFT1" data is started (S412).

Further, similarly to S214 and S216 in the first embodiment, position register request and response are transmitted/received (S414 and S416). Updating of the flow management table and switching of transfer paths and other procedures after establishment of the specific EPS bearer are the same as those in the above embodiment, so that description is omitted.

The difference of the third embodiment from the first embodiment is that upon the attach request (S402) at the timing of a handover, only the authentication process is carried out without establishment of the default EPS bearer and then UE 10 transmits a specific EPS bearer establishment request. Thereby, it is possible to complete a handover more quickly without the need of establishing the default EPS bearer (EPS bearer 1), compared to the first embodiment.

Also, in the present embodiment, instead of requesting establishment of a specific EPS bearer by notifying the flow information and QoS level upon specific EPS bearer establishment request, the flow information and QoS level may be added so as to establish a specific EPS bearer, at the time of PSMIPv6 position register request, similarly to the second embodiment.

Further, it goes without saying that it is possible to perform a handover procedure in a conventional manner as in the first embodiment when an attach request is made by attachment type "2".

Moreover, though description was made that the position register request/response are given after establishment of the specific EPS bearer (EPS bearer 2), position register complete notice/response from PGW 20 to UE 10 may also be given. That is, PGW 20 transmits a position register complete notice that indicates that position register of UE 10 after handover is completed, to UE 10. UE 10 transmits a response signal that acknowledges the reception of the position register complete notice, to PGW 20. Further, switching of transfer paths at PGW 20 may be triggered by the position register complete notice/response procedure from PGW 20 to UE 10.

4.4 The Fourth Embodiment

Next, the fourth embodiment will be described. The network configuration and apparatus configuration of this embodiment are the same as those of the first embodiment, so that detailed description is omitted. Further, since the procedures in which UE 10 connects to a core network via access network B and establishes the DSMIPv6 transfer path for flow 1 and flow 2 are also the same, the description is omitted.

Figure 12:
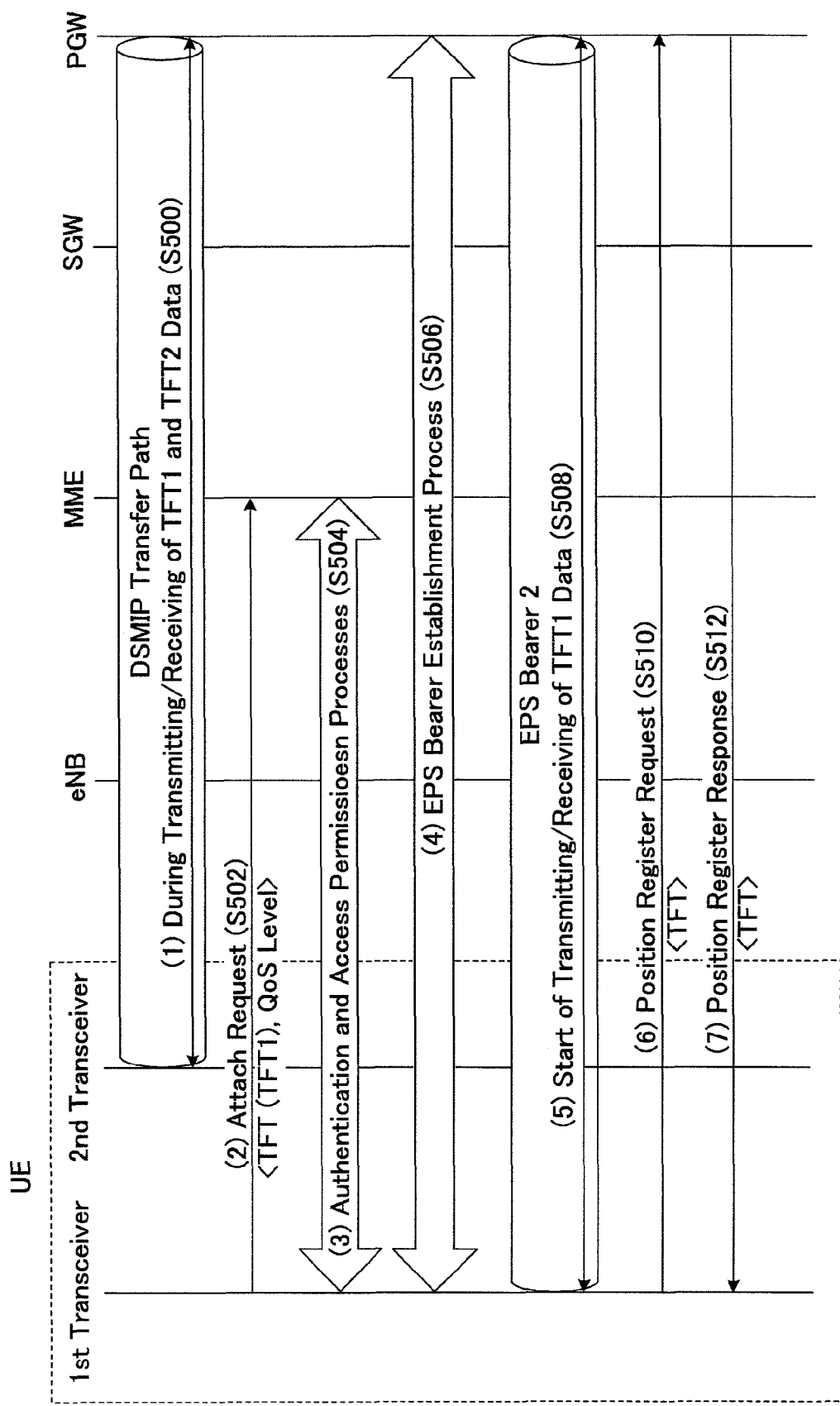
[FIG. 12] is a diagram for illustrating the processing flow in the fourth embodiment.
Figure 13:
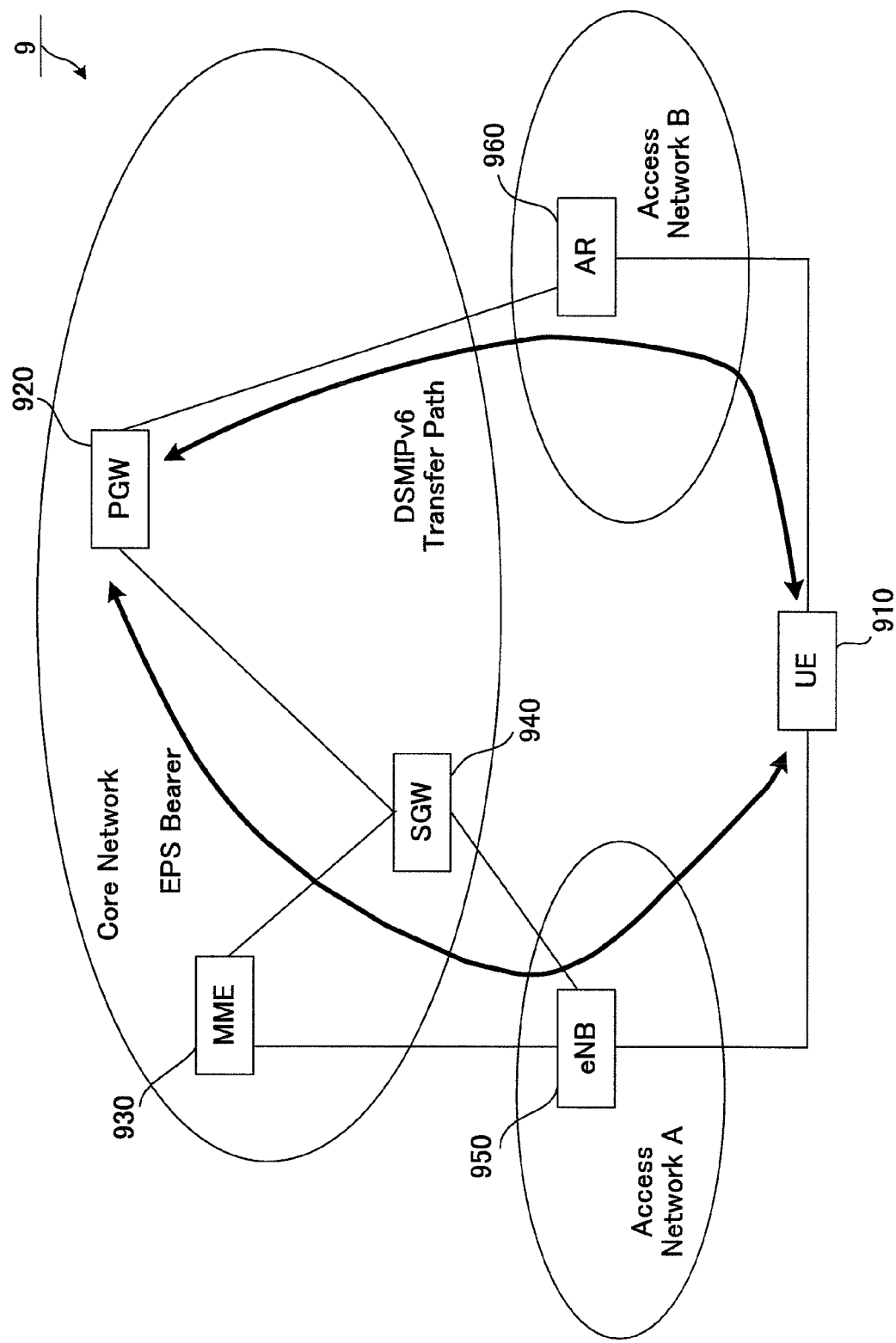
[FIG. 13] is a diagram for illustrating the overall scheme of a conventional mobile communication system.

As the initial state at the time of a handover, UE 10 is performing communication of flow 1 and flow 2 through the DSMIPv6 transfer path by way of access network B. At the time of a handover, UE 10 enters the coverage area of eNB 50 of access network A and transmits a handover request by a control message using first transceiver 110 to execute a handover procedure. Here, the procedure in the fourth embodiment will be described with reference to FIG. 12.

(1) Initially, UE 10 and PGW 20 are transmitting/receiving data for flow 1 (TFT1) and flow 2 (TFT2) through the DSMIPv6 transfer path (S500).

(2) Then, UE 10 transmits an attach request to MME 30 (S502). Here, the attach request of the present embodiment includes identification information on UE 10 for authenticating UE 10 and permitting access. The difference from the first embodiment is that the attach request is transmitted with inclusion of the information ("TFT1" to be handed over and QoS level) on the flow to be handed over.

(3) MME 30 having received the attach request, performs an authentication and access permission processes by the procedure between UE 10 and eNB 50 following the conventional method (S504). Specifically, MME 30 having received an attach request, transmits a default EPS bearer establishment request to PGW 20. PGW 20, as receiving the default EPS bearer establishment request, executes a process of establishing an EPS bearer. Here, the default EPS bearer establishment request includes information on the flow to be handed over, included in the attach request.

Figure 11:
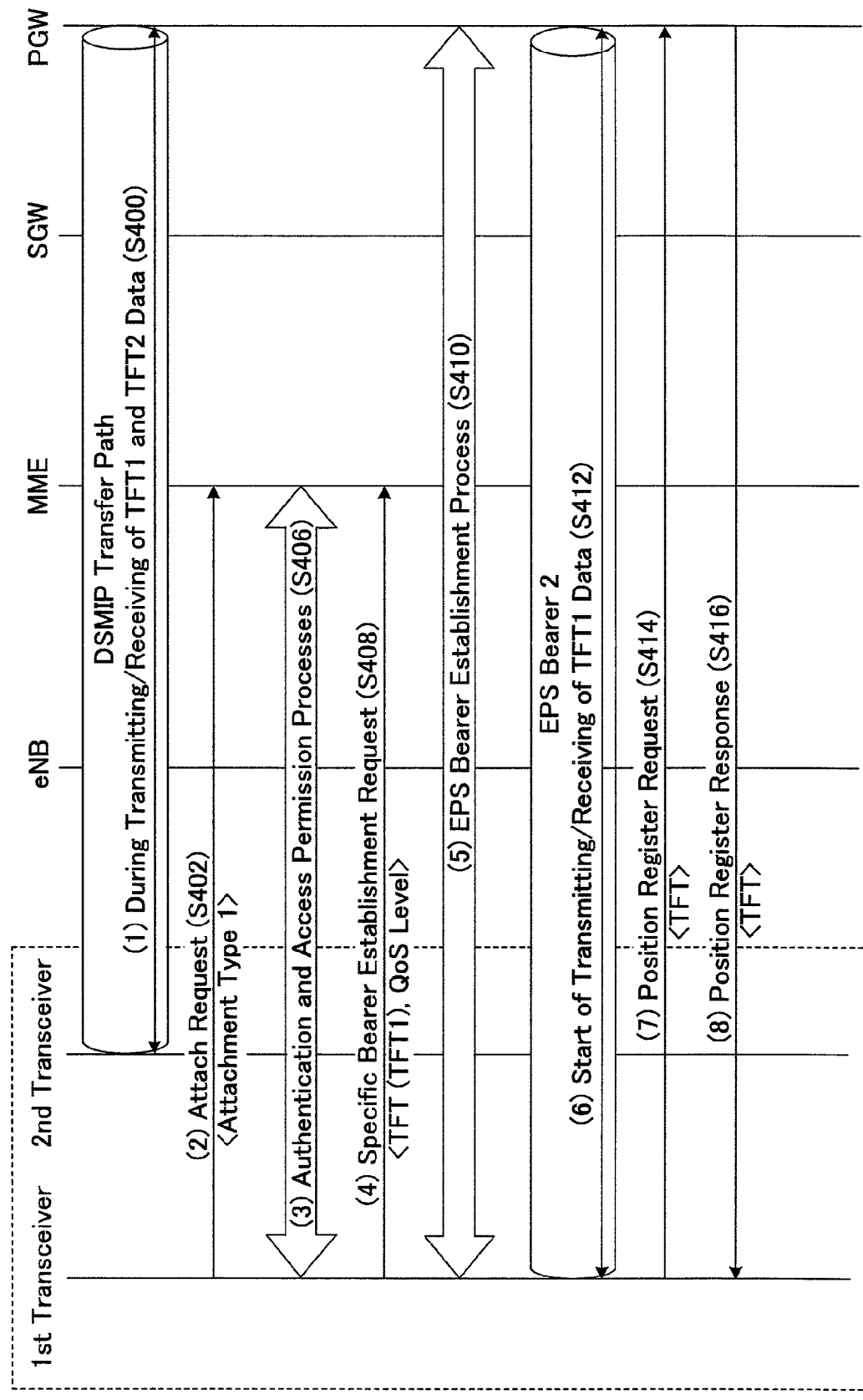
[FIG. 11] is a diagram for illustrating the processing flow in the third embodiment.

(4) MME 30 implements a process of establishing a specific EPS bearer to UE 10 that was permitted to connect, similarly to S410 in FIG. 11 for the third embodiment (S506).

Thereby, a specific EPS bearer (EPS bearer 2) is established between UE 10 and PGW 20. Then, a path is set up on the established EPS bearer 2 so that data transmission/reception of "TFT1" is started (S508).

Further, similarly to S214 and S216 in the first embodiment, position register request and response are transmitted/received (S510 and S512). Updating of the flow management table and switching of transfer paths and other procedures after establishment of the specific EPS bearer are the same as those in the above embodiment, so that description is omitted.

The difference of the present embodiment from the first embodiment is that in the first embodiment the default EPS bearer is established first at the time of a handover, then the specific EPS bearer is established, whereas in the fourth embodiment the specific EPS bearer can be established by the attach request. Thereby, the procedure of establishing the default EPS bearer is omitted so that it is possible to complete a handover more quickly, compared to the first embodiment.

Also, in the present embodiment, instead of requesting establishment of a specific EPS bearer by notifying the flow information and QoS level upon specific EPS bearer establishment request, the flow information and QoS level may be added so as to establish a specific EPS bearer, at the time of PSMIPv6 position register request, similarly to the second embodiment.

Further, if the attach request includes no flow information and QoS level, the conventional handover procedure can be carried out.

Moreover, in the present embodiment, though description was made that the position register request/response are given after establishment of the specific EPS bearer (EPS bearer 2), position register complete notice/response from PGW 20 to UE 10 may also be given. That is, PGW 20 transmits a position register complete notice that indicates that position register of UE 10 after handover is completed, to UE 10. UE 10 transmits a response signal that acknowledges the reception of the position register complete notice, to PGW 20. Further, switching of transfer paths at PGW 20 may be triggered by the position register complete notice/response procedure from PGW 20 to UE 10.

Description Of Reference Numerals
1 mobile communication system
  10 UE
    100 controller
    110 first transceiver
    120 second transceiver
    130 storage
      132 flow management table
    140 bearer establishment processor
    150 DSMIPv6 processor
    160 packet transceiver
  20 PGW
    200 controller
    210 transceiver
    230 storage
      232 flow management table
    240 bearer establishment processor
    250 DSMIPv6 processor
    260 packet transceiver
  30 MME
  40 SGW
  50 eNB
  60 AR

The invention claimed is:

1. A User Equipment (UE) in a mobile communication system that comprises a Packet data Gateway (PGW) and the UE, the UE comprising:
    a control circuit configured to establish a first transfer path by way of a first access network between the UE and the PGW, wherein
    when performing transmission/reception of a plurality of flows with the PGW by using the first transfer path, the control circuit is configured to establish a default EPS (Evolved Packet System) bearer as a second transfer path by way of a second access network between the UE and the PGW by transmitting an attach request for starting an attach procedure; and
    the control circuit configured to establish a specific EPS bearer as a third transfer path by way of the second access network between the UE and the PGW after transmitting a notice including identification information that identifies a specific flow among the plurality of flows, to the PGW by way of the second access network; wherein
    the control circuit is configured to switch a transfer path for performing transmission/reception of the specific flow to the third transfer path by way of the second access network.

2. A Packet data Gateway (PGW) in a mobile communication system that comprises the PGW and a User Equipment (UE), the PGW comprising:
    a control circuit configured to establish a first transfer path by way of a first access network between the UE and the PGW, wherein when performing transmission/reception of a plurality of flows with the UE by using the first transfer path, the control circuit is configured to establish a default EPS (Evolved Packet System) bearer as a second transfer path by way of a second access network between the UE and the PGW in accordance with transmission of an attach request for starting an attach procedure; and
    the control circuit configured to establish a specific EPS bearer as a third transfer path by way of the second access network between the UE and the PGW after receiving a notice including identification information that identifies a specific flow among the plurality of flows, from the UE by way of the second access network, wherein the control circuit is configured to switch a transfer path for performing transmission/reception of the specific flow to the third transfer path by way of the second access network.

3. A mobile communication system comprising:
a Packet data Gateway (PGW); and
a User Equipment (UE), wherein
the PGW and the UE are configured to establish a first transfer path by way of a first access network between the UE and the PGW, when performing transmission/reception of a plurality of flows by using the first transfer path, the UE and the PGW are configured to establish a default EPS (Evolved Packet System) bearer as a second transfer path by way of a second access network between the UE and the PGW by transmitting an attach request of the UE for starting an attach procedure, the UE is configured to establish a specific EPS bearer as a third transfer path by way of the second access network between the UE and the PGW after transmitting a notice including identification information that identifies a specific flow among the plurality of flows, to the PGW by way of the second access network; and the UE and the PGW are configured to switch a transfer path for performing transmission/reception of the specific flow to the third transfer path by way of the second access network.

4. A communication method for a User Equipment (UE) in a mobile communication system that includes a Packet data Gateway (PGW) and the UE, the method comprising:
establishing, in the UE, a first transfer path by way of a first access network between the UE and the PGW;

when performing transmission/reception of a plurality of flows with the PGW by using the first transfer path, establishing a default EPS (Evolved Packet System) bearer as a second transfer path by way of a second access network between the UE and the PGW by transmitting an attach request for starting an attach procedure;

establishing a specific EPS bearer as a third transfer path by way of the second access network between the UE and the PGW after transmitting a notice including identification information that identifies a specific flow among the plurality of flows, to the PGW by way of the second access network; and switching a transfer path for performing transmission/reception of the specific flow to the third transfer path by way of the second access network.

5. A communication method for a Packet data Gateway (PGW) in a mobile communication system that comprises the PGW and a User Equipment (UE), the method comprising:
establishing, in the PGW, a first transfer path by way of a first access network between the UE and the PGW;

when performing transmission/reception of a plurality of flows with the UE by using the first transfer path, establishing a default EPS (Evolved Packet System) bearer as a second transfer path by way of a second access network between the UE and the PGW in accordance with transmission of an attach request from the UE for starting an attach procedure;

establishing a specific EPS bearer as a third transfer path by way of the second access network between the UE and the PGW after receiving a notice including identification information that identifies a specific flow among the plurality of flows, from the UE by way of the second access network; and switching a transfer path for performing transmission/reception of the specific flow to the third transfer path by way of the second access network.

6. A communication method for a mobile communication system which comprising a Packet data Gateway (PGW) and a User Equipment (UE), the method comprising:
establishing a first transfer path by way of a first access network between the UE and the PGW;

when performing transmission/reception of a plurality of flows by using the first transfer path, establishing a default EPS (Evolved Packet System) bearer as a second transfer path by way of a second access network between the UE and the PGW in accordance with transmission of an attach request of the UE for starting an attach procedure;

establishing a specific EPS bearer as a third transfer path by way of the second access network between the UE and the PGW after transmitting a notice including identification information that identifies a specific flow among the plurality of flows, to the PGW by way of the second access network; and switching a transfer path for performing transmission/reception of the specific flow to the third transfer path by way of the second access network.

* * * * *